No. 664,234. Patented Dec. 18, 1900.
H. J. CHAMBERS.
DETACHABLE HINGE COUPLING FOR VEHICLES.
(Application filed June 20, 1900.)
(No Model.)
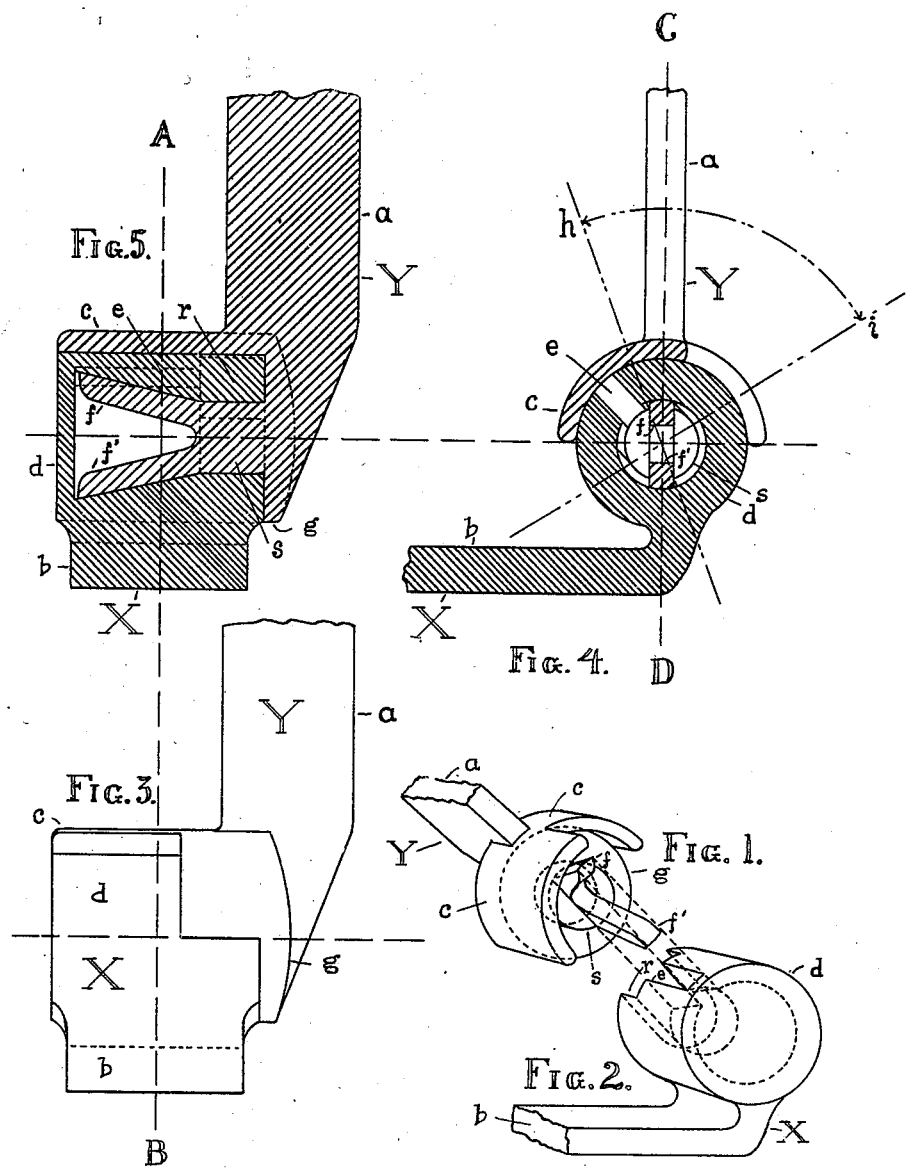
WITNESSES:
Carroll W. Kimball.
William H Killpack
Hamline James Chambers
INVENTOR.
BY Clem. F. Kimball
ATTORNEY.

UNITED STATES PATENT OFFICE.

HAMLINE JANES. CHAMBERS, OF COUNCIL BLUFFS, IOWA.

DETACHABLE HINGE-COUPLING FOR VEHICLES.

SPECIFICATION forming part of Letters Patent No. 664,234, dated December 18, 1900.

Application filed June 20, 1900. Serial No. 21,027. (No model.)

*To all whom it may concern:*

Be it known that I, HAMLINE JANES CHAMBERS, a citizen of the United States, residing at Council Bluffs, county of Pottawattamie, and State of Iowa, have invented a new and useful Improvement in Antirattling Detachable Hinge-Couplings for Vehicles, of which the following is a specification.

My invention relates to improvements in antirattling detachable hinge-couplings such as are ordinarily used to connect the thills and poles to vehicles drawn by horses, but which may be applied to any art where it is desired to form a hinge connection; and it consists of two parts or members suitably arranged to be fastened to the objects desired to be coupled together, one of which parts or members has a socket enlarged at the bottom, the part containing said socket being round or cylindrical and slotted in one side to admit a round and forked projection formed upon the other part into said socket, and the two parts when thus engaged are hinged together within a limited angle of movement.

The objects of my invention are, first, to provide a hinged coupling such as is ordinarily used to connect thills and poles to vehicles which will be capable of being detached by turning one member of the hinge-joint at an angle with the other to which it never reaches when in use; second, to provide such a detachable hinge-coupling that will fit tightly together and will not rattle or make a noise; third, to form such a coupling of two pieces of simple construction, and, fourth, to provide such a coupling as will keep out sand and dust, thus preventing excessive wear. These objects are attained by the device shown in the accompanying drawings, in which—

Figure 1 is a perspective view of one member or part of the hinge and which will be designated as part Y. Fig. 2 is the other member or part of the hinge in perspective, which will be designated as the socket X. Fig. 3 is a side elevation of the two parts engaged, with the attaching projections $a$ and $b$ at right angles to each other, a position which they may take when in use. Fig. 4 is a cross-section on the line A B in Figs. 3 and 5, showing the parts coupled together. Fig. 5 is a cross-section on the line C D, Fig. 4, of the coupling.

Similar letters refer to similar parts and corresponding portions of the parts throughout the drawings.

The coupling consists of the two parts, made of suitable material, X and Y, one part X of which has a socket enlarged at the bottom, formed with a cylindrical or round piece $d$, having a suitable projection $b$ for attaching the same to the axle of the vehicle or other desired object. The socket in the part X may be wholly conical or partially cylindrical, or it may be of other curved or irregular form in longitudinal cross-section, so that the bottom of the socket will be larger than the opening; but I prefer the form as shown in Fig. 5, partially a conical and partially a cylindrical socket. At a suitable place, determined by the angle of the members at which it is desired to use the coupling, the round or cylindrical portion $d$ of the part X is slotted at $e$ and $r$, that part of the slot $e$ being narrow and that part of the slot $r$ of a greater width, equal to the diameter of a portion of the socket. The part Y, like the part X, has a suitable projection $a$ for attachment to the thill, pole, or other desired object, and at $s$ a round pivot projecting out and terminating in two flattened forks $f$ and $f'$, which round pivot fits into the socket in $d$ and which forks when slightly sprung together fit tightly in said socket, the said pivot $s$ and forks $f$ and $f'$ being so arranged as to slip easily into the respective slots $r$ and $e$ in the part $d$ when the projection $a$ is turned to the proper angle with $b$. The part Y also has a flange or shoulder at $g$, which covers the end of the socket-piece $d$, and extending out from this flange or shoulder is an apron $c$, a part of which forms a semicircular covering of the cylindrical or round part $d$ and is formed to cover the slots $r$ and $e$ when the projection $a$ is at any angle with $b$ which it may make when in use.

From this description, in which the drawings is intended for illustration of the principle of the invention and not for limitation, it will easily be seen that if the thill, pole, or other connected object be turned so that the attaching projection $a$ of the part Y reaches an angle with the attaching projection $b$ of the part X not reached by said parts $a$ and $b$ when in use and the forks $f$ and $f'$ are slipped into the slot $e$ and the round part $s$ into the slot $r$ and the part with the thill, pole, or other attached object be turned back into the range of the angle $h\,i$, Fig. 4, within which it hinges when in use, and into a position shown in Figs. 3, 4, and 5, the forks $f$ and $f'$, which are spread apart at the ends, making them slightly larger than the diameter of the corresponding place in the socket, are sprung together by reason of the fork $f$ being slightly beveled or rounded on the top edges. These forks $f$ and $f'$ are sufficiently elastic to press out tightly against the inner surface of the socket in $d$ and remain under tension, thus preventing the parts rattling or making a noise, and at the same time by reason of the shape of the socket, as is shown in Fig. 5, said forks $f$ and $f'$ tend to draw the flange or shoulder $g$ of the part Y up tightly to the end of the socket in $d$ of the part X, thus preventing side rattle, motion, or noise. The apron $c$ extends over the slots $e$ and $r$ and around opposite the same, keeping out sand and dirt and preventing the pivot $s$ from slipping back out of the slot $r$ when such tendency is caused by force exerted upon it. By turning the thill, pole, or other attached object up or back to a point which it never reaches when in use or by a reversal of the movement used to engage the parts the thill, pole, or other attached object may be easily released from the other by lifting the member Y and the pivot $s$ and the forks $f$ and $f'$ thereof up and out of the slots $r$ and $e$ provided for that purpose, thus making the said parts easily detachable.

I am aware that detachable thill connections have been made prior to my invention thereof; but I am not aware that they have been made in the pivot-and-socket form and as simply formed to prevent rattling as my invention.

I claim, therefore, and wish to secure by Letters Patent—

1. A hinged coupling consisting of a socket, suitably slotted in one side to receive a pivot, and a split or forked pivot engaging said socket; said socket and pivot having suitable projection and means for attachment substantially as described.

2. A hinged coupling consisting of a socket enlarged at the bottom, and slotted in one side to receive a pivot and having a suitable projection for attachment; and a pivot split or forked and arranged to fit into and engage said socket substantially as described and for the purposes set forth.

3. A hinged coupling consisting of a socket enlarged at the bottom thereof, and a pivot engaging said socket, each having a projection suitable for attachment; said socket slotted upon one side to receive said pivot; a portion of said pivot flattened and formed into two elastic forks fitting into said socket substantially as described and for the purposes set forth.

4. A hinged coupling consisting of a socket enlarged at the bottom thereof, and a pivot fitting therein, said socket and pivot having suitable projections for attachment; said socket having a slot on one side to receive said pivot; said pivot having slightly elastic forks, a flange and apron, all substantially as described and for the purposes set forth.

5. A hinge-coupling consisting of a cylindrical-formed part with projection for attachment and a socket therein enlarged at the bottom thereof, a slot in the side to receive a pivot, and a pivot engaging said socket, a flange, a portion of said pivot split into an elastic fork, and apron covering and to cover said slots, substantially as described and for the purposes set forth.

6. A round or cylindrical part having a suitable projection for attachment, an inverted conical socket therein, a slot in the side thereof, said socket engaging a split pivot, having elastic forks fitting in said socket, and an apron engaging said round or cylindrical part, a flange or shoulder, and projection for attachment; forming a hinge-coupling, all substantially as described and for the purposes set forth.

HAMLINE JANES CHAMBERS.

Witnesses:
  GEORGE JACOBS,
  PAUL C. CYLESWORTH.